(12) United States Patent
Ali et al.

(10) Patent No.: US 10,574,744 B2
(45) Date of Patent: Feb. 25, 2020

(54) SYSTEM AND METHOD FOR MANAGING PEER-TO-PEER INFORMATION EXCHANGES

(71) Applicant: Dell Products L.P., Round Rock, TX (US)

(72) Inventors: Raziuddin Ali, Austin, TX (US);
Claude Lano Cox, Austin, TX (US);
Philip M. Seibert, Austin, TX (US);
Jason A. Shepherd, Austin, TX (US);
Yuan-Chang Lo, Austin, TX (US);
Michael S. Gatson, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 652 days.

(21) Appl. No.: 13/755,237

(22) Filed: Jan. 31, 2013

(65) Prior Publication Data

US 2014/0215039 A1    Jul. 31, 2014

(51) Int. Cl.
*H04L 29/08* (2006.01)

(52) U.S. Cl.
CPC .......... *H04L 67/104* (2013.01); *H04L 67/327* (2013.01)

(58) Field of Classification Search
CPC ... H04W 8/005; H04W 4/008; H04W 76/023; H04W 52/0229; H04W 84/12; H04W 4/003; H04W 76/02; H04W 84/18; H04W 12/06; H04W 12/08; H04W 4/12; H04W 4/16; H04W 88/04; H04W 8/22; H04W 12/10; H04W 24/08; H04W 28/20; H04W 28/26; H04W 48/16; H04W 4/001; H04W 4/005; H04W 4/70; H04W 48/08; H04W 9/006; H04W 4/80; H04L 12/12; H04L 12/1822; H04L 12/1836; H04L 12/2807; H04L 12/2825; H04L 12/2827;
(Continued)

(56) References Cited

U.S. PATENT DOCUMENTS

| | | | |
|---|---|---|---|
| 5,812,865 A | * | 9/1998 | Theimer .................. G06F 9/547 379/88.13 |
| 6,052,727 A | | 4/2000 | Kamalanathan |

(Continued)

FOREIGN PATENT DOCUMENTS

WO    WO-2012000107 A1    1/2012

OTHER PUBLICATIONS

Scarfone, Karen et al., "Guidelines on Firewalls and Firewall Policy", National Institute of Standards and Technology, NIST Special Publication 800-41, Revision 1, Sep. 2009, 48 pages.
(Continued)

*Primary Examiner* — Backhean Tiv
*Assistant Examiner* — Linh T. Nguyen
(74) *Attorney, Agent, or Firm* — Winstead PC

(57) ABSTRACT

In one embodiment, a method includes, on a peer-to-peer (P2P) network entity, acquiring dynamic context information for a proposed P2P information exchange. The method further includes performing, by the P2P network entity, a rules-engine check to determine an allowability of the proposed P2P information exchange given the dynamic context information. The rules-engine check yields at least one specified action relative to the proposed P2P information exchange. The method also includes taking, by the P2P network entity, the at least one specified action.

17 Claims, 5 Drawing Sheets

(58) Field of Classification Search
CPC .............. H04L 12/2836; H04L 12/2876; H04L 12/4625; H04L 12/58; H04L 12/6418; H04L 12/66; H04L 1/1607; H04L 2012/2841; H04L 2012/2849; H04L 29/06; H04L 29/08; H04L 63/105; H04L 63/123; H04L 63/126; H04L 63/164; H04L 63/166; H04L 63/20; H04L 63/205; H04L 65/1006; H04L 65/1026; H04L 65/1036; H04L 65/105; H04L 65/1083; H04L 65/40; H04L 65/60; H04L 67/02; H04L 67/025; H04L 67/04; H04L 67/104; H04L 67/1068; H04L 67/1072; H04L 67/14; H04L 67/16; H04L 67/303; H04L 9/3273; H04L 2209/80; H04L 63/0823; H04L 9/321; H04L 63/10; H04L 63/061; H04L 63/0869; H04L 63/101; H04L 9/006; H04L 63/0263; H04L 47/20; H04L 2463/082; H04L 63/08; H04L 67/141; H04L 63/108; H04L 69/24; H04L 9/3723; G06F 21/445; G06F 21/31; G06F 2221/2141; G06F 21/00; G06F 2221/2113; G06F 21/35; G06F 21/62; H04M 1/72547; H04M 3/53375; H04M 7/0042; H04M 7/006; H04M 1/2535
USPC ....... 709/203, 204, 227, 238, 229, 225, 224, 709/202, 208, 217; 726/4, 27, 5, 28, 21, 726/2, 26, 1; 713/155; 455/41.1
See application file for complete search history.

(56) References Cited

U.S. PATENT DOCUMENTS

| | | | |
|---|---|---|---|
| 7,512,971 B2* | 3/2009 | Ellington ................ G06F 21/31 | 709/225 |
| 7,587,411 B2 | 9/2009 | De Vorchik et al. | |
| 7,606,860 B2 | 10/2009 | Puthenkulam et al. | |
| 7,684,438 B2* | 3/2010 | Stephens et al. ............. | 370/466 |
| 8,250,150 B2 | 8/2012 | Beck et al. | |
| 8,254,902 B2 | 8/2012 | Bell et al. | |
| 8,594,632 B1* | 11/2013 | Azizi et al. .................... | 455/411 |
| 2001/0019614 A1* | 9/2001 | Madoukh .......... G06F 17/30067 | 380/277 |
| 2002/0010679 A1* | 1/2002 | Felsher ................ G06F 19/322 | 705/51 |
| 2003/0028782 A1* | 2/2003 | Grundfest .............. G06Q 10/10 | 713/182 |
| 2003/0050977 A1 | 3/2003 | Puthenkulam et al. | |
| 2003/0096633 A1* | 5/2003 | Goldberg ...................... | 455/556 |
| 2004/0073672 A1* | 4/2004 | Fascenda ............. H04W 12/08 | 709/225 |
| 2004/0181689 A1* | 9/2004 | Kiyoto ................. H04L 63/164 | 726/1 |
| 2005/0044146 A1* | 2/2005 | Nassor et al. .......... H04L 29/06 | 709/205 |
| 2005/0044411 A1* | 2/2005 | Somin et al. ............ H04L 9/00 | 726/4 |
| 2005/0266798 A1* | 12/2005 | Moloney ............ H04L 63/0435 | 455/41.2 |
| 2005/0289264 A1* | 12/2005 | Illowsky ............... G06F 1/3203 | 710/104 |
| 2006/0223527 A1* | 10/2006 | Lee ...................... H04W 48/08 | 455/432.2 |
| 2007/0088801 A1* | 4/2007 | Levkovitz ........... H04L 12/1859 | 709/217 |
| 2007/0287418 A1 | 12/2007 | Reddy | |
| 2007/0288623 A1* | 12/2007 | Kato ...................... G06F 21/33 | 709/223 |
| 2008/0037723 A1* | 2/2008 | Milstein ............ H04M 3/53375 | 379/88.12 |
| 2008/0140849 A1* | 6/2008 | Collazo .................. G06F 15/16 | 709/229 |
| 2008/0304408 A1* | 12/2008 | Kraemer et al. .............. | 370/230 |
| 2009/0111467 A1* | 4/2009 | Chai et al. .................. | 455/435.1 |
| 2009/0264098 A1 | 10/2009 | Lo et al. | |
| 2010/0268768 A1* | 10/2010 | Kurtenbach ........ H04L 67/1097 | 709/203 |
| 2010/0272083 A1* | 10/2010 | Itoh ....................... H04W 24/02 | 370/338 |
| 2010/0293598 A1* | 11/2010 | Collart .............. G06F 17/30056 | 726/3 |
| 2011/0082940 A1* | 4/2011 | Montemurro et al. ........ | 709/227 |
| 2011/0223860 A1 | 9/2011 | Lo et al. | |
| 2011/0320599 A1* | 12/2011 | Matsumoto ........... G06F 21/305 | 709/225 |
| 2012/0072592 A1* | 3/2012 | Lidstrom ................ H04L 47/20 | 709/224 |
| 2012/0170451 A1* | 7/2012 | Viswanathan ........ H04W 4/005 | 370/230 |
| 2012/0172027 A1 | 7/2012 | Partheesh et al. | |
| 2012/0172054 A1* | 7/2012 | Waters et al. ............... | 455/456.1 |
| 2012/0188905 A1 | 7/2012 | Dandekar et al. | |
| 2012/0243437 A1 | 9/2012 | Horn et al. | |
| 2012/0244832 A1 | 9/2012 | Carlander | |
| 2012/0246294 A1* | 9/2012 | Eaton et al. .................... | 709/224 |
| 2012/0265913 A1* | 10/2012 | Suumaki et al. ............. | 710/303 |
| 2012/0284769 A1 | 11/2012 | Dixon et al. | |
| 2012/0296986 A1* | 11/2012 | Hassan et al. ................ | 709/206 |
| 2012/0310527 A1 | 12/2012 | Yariv et al. | |
| 2012/0317619 A1* | 12/2012 | Dattagupta ........... H04W 12/08 | 726/4 |
| 2013/0065627 A1* | 3/2013 | Jung et al. ..................... | 455/515 |
| 2013/0110979 A1* | 5/2013 | Zhu et al. ...................... | 709/219 |
| 2013/0144731 A1 | 6/2013 | Baldwin et al. | |
| 2013/0150117 A1 | 6/2013 | Rodriguez et al. | |
| 2013/0331127 A1 | 12/2013 | Sabatelli et al. | |
| 2014/0068717 A1* | 3/2014 | Mayes .................... G06F 21/33 | 726/3 |
| 2014/0149498 A1* | 5/2014 | Nandlall et al. .............. | 709/204 |
| 2014/0171099 A1 | 6/2014 | Sydir et al. | |
| 2014/0208382 A1* | 7/2014 | Zlatarev ................ G06F 21/602 | 726/3 |
| 2014/0213181 A1* | 7/2014 | Rosenberg ........... H04B 5/0031 | 455/41.1 |
| 2014/0259124 A1* | 9/2014 | Petersen ............. H04L 63/0823 | 726/4 |
| 2015/0117318 A1* | 4/2015 | Qi ........................ H04W 76/18 | 370/329 |
| 2016/0080364 A1* | 3/2016 | Karimzadeh ........... G06F 21/34 | 726/6 |
| 2016/0248748 A1* | 8/2016 | Caterino ................ H04L 63/08 | |

OTHER PUBLICATIONS

Debes, M. et al., "Definition and Implementation of Context Information", Proceedings of the 2nd Workshop on Positioning, Navigation and Communication (WPCN'05) & 1st Ultra-Wideband Expert Talk (UET'05), 2005, pp. 63-68.
U.S. Appl. No. 13/776,104, Ali.
Bluenio, "nioPremium", Bluenio ltd, 2012, 3 pages.
Bluenio, "nioGuard", Bluenio ltd, 2012, 3 pages.
Bluenio, "nioSoft Tag", Bluenio ltd., 2012, 3 pages.
Bluenio, "nioTag", Bluenio ltd, 2012, 2 pages.
Bluenio, "Don't let losing something ruin your day", Bluenio ltd, 2012, 2 pages.
Bluenio, "96% of lost phones have their data accessed", Bluenio ltd, 2012, 3 pages.
Bluenio, "nio", Bluenio ltd, 2012, 3 pages.
Bluenio, "70 million smartphones are lost every year", Bluenio ltd, 2012, 2 pages.
SeekDroid AntiTheft and Security, GT Media, LLC, Feb. 2013, 2 pages.

(56) References Cited

OTHER PUBLICATIONS

SeekDroid, Track your phone. Secure your data. Anywhere., GT Media, LLC, 2011, 4 pages.
Squiggly, my app.factory, Feb. 2013, 2 pages.

* cited by examiner

SYSTEM AND METHOD FOR MANAGING PEER-TO-PEER INFORMATION EXCHANGES

BACKGROUND

Technical Field

The present invention relates generally to information security and more particularly, but not by way of limitation, to systems and methods for peer-to-peer discovery and connectivity management.

History of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As a result of advances in communications technology, peer-to-peer (P2P) communication between information handling systems is becoming easier and more prevalent. For example, using Wi-Fi-based P2P networking technology, it is possible to form a small network hosted by a virtual access point on an information handling system. The virtual access point can connect other information handling systems such as, for example, peripheral devices, that are in close proximity. The greater ease and prevalence of potential P2P communication, however, creates new privacy and security concerns. Moreover, the potential for large numbers of disparate devices with which a user can connect can be a confusing proposition for users.

SUMMARY OF THE INVENTION

In one embodiment, a method includes, on a peer-to-peer (P2P) network entity, acquiring dynamic context information for a proposed P2P information exchange. The method further includes performing, by the P2P network entity, a rules-engine check to determine an allowability of the proposed P2P information exchange given the dynamic context information. The rules-engine check yields at least one specified action relative to the proposed P2P information exchange. The method also includes taking, by the P2P network entity, the at least one specified action.

In one embodiment, an information handling system includes a network interface operable to perform peer-to-peer (P2P) information exchanges. The information handling system further includes a processing unit communicably coupled to the network interface. The processing unit is operable to acquire dynamic context information for a proposed P2P information exchange. The processing unit is further operable to perform a rules-engine check to determine an allowability of the proposed P2P information exchange given the dynamic context information. The rules-engine check yields at least one specified action relative to the proposed P2P information exchange. In addition, the processing unit is operable to take the at least one specified action.

In one embodiment, a computer-program product includes a computer-usable medium having computer-readable program code embodied therein. The computer-readable program code is adapted to be executed to implement a method. The method includes acquiring dynamic context information for a proposed P2P information exchange. The method further includes performing a rules-engine check to determine an allowability of the proposed P2P information exchange given the dynamic context information. The rules-engine check yields at least one specified action relative to the proposed P2P information exchange. The method also includes taking the at least one specified action.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, peer-to-peer (P2P) communication can be facilitated and made more secure via systems and methods described herein. In a typical embodiment, P2P information exchanges are variably controlled based on dynamic context information.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, touchscreen and/or a video display. The information handling system may also include one or more buses operable to transmit communications between the various hardware components.

A P2P network entity, as used herein, refers to a device, virtual device, or service having an ability to perform P2P information exchanges. A P2P network entity can be, for example, an information handling system. It should be appreciated that a given device can host multiple virtual devices. Similarly, a given device or virtual device can host multiple services. A P2P information exchange, as used herein, is an action taken by a P2P network entity on a P2P network. A proposed P2P information exchange, as used herein, is a P2P information exchange that has been requested, triggered, or is otherwise of interest but that has not been authorized to be performed.

A P2P transport application, as used herein, is a software application that is operable to facilitate P2P communication. Dynamic context information, as used herein, refers to variable characteristics of a proposed P2P information exchange and/or of an environment in which the proposed P2P information exchange would occur. Such variable characteristics may be referenced herein as contextual variables. Dynamic context information that provides values for contextual variables may be referenced herein as contextual values.

Figure 1:
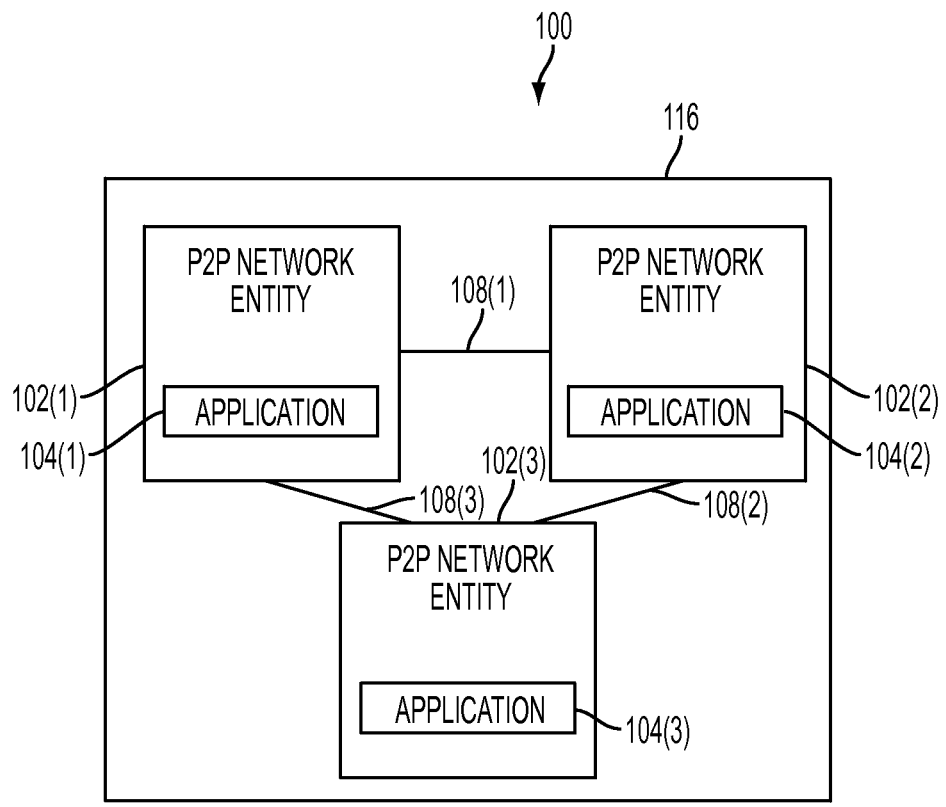
FIG. 1 illustrates a system for managing P2P information exchanges.

FIG. 1 illustrates a system 100 for managing P2P information exchanges. The system 100 includes a P2P network 116. The P2P network 116 includes a P2P network entity 102(1), a P2P network entity 102(2), and a P2P network entity 102(3) (collectively, P2P network entities 102). For illustrative purposes, the P2P network 116 is shown to include three P2P network entities (i.e., the P2P network entities 102). However, it should be appreciated that, in practice, the P2P network 116 can include any number of P2P network entities. In addition, in a typical embodiment, the number of P2P network entities can change from moment to moment so that the P2P network 116 can be considered an ad hoc network. The P2P network entities 102(1), 102(2), and 102(3) have loaded and executing thereon a P2P transport application 104(1), a P2P transport application 104(2), and a P2P transport application 104(3), respectively (collectively, P2P transport applications 104).

In a typical embodiment, the P2P transport applications 104 manage P2P information exchanges by the P2P network entities 102. For example, the P2P transport applications 104 can manage transmission of discovery requests and discovery responses, control which P2P network entities to which a user can choose to connect, and oversee individual P2P communications. In this fashion, the P2P transport applications are operable to establish and supervise communication over a P2P link 108(1), a P2P link 108(2), and a P2P link 108(3) (collectively, P2P links 108).

As shown, the P2P network entity 102(1) and the P2P network entity 102(2) are connected by the P2P link 108(1), the P2P network entity 102(2) and the P2P network entity 102(3) are connected by the P2P link 108(2), and the P2P network entity 102(1) and the P2P network entity 102(3) are connected by the P2P link 108(3). In a typical embodiment, the P2P links 108 enable P2P communication between connected ones of the P2P network entities 102 as permitted by the P2P transport applications 104. For example, in various embodiments, the P2P links 108 can be enabled via Wi-Fi direct. However, it should be appreciated that any other method of P2P communication can also be utilized.

It should be appreciated that the P2P links 108 are logical in nature and are not necessarily representative of physical connections. For example, in various embodiments in which Wi-Fi Direct is utilized, one of the P2P network entities 102 would be considered a group owner and would host a virtual access point. In these embodiments, all of the P2P network entities 102, including the group owner, would logically communicate as represented by the P2P links 108. However, on a physical level, the communication would occur via the virtual access point provided by the group owner.

Figure 2:
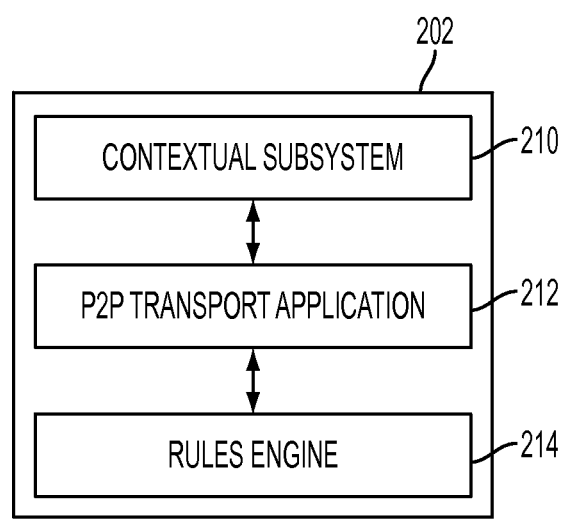
FIG. 2 illustrates a P2P network entity.

FIG. 2 illustrates a P2P network entity 202. The P2P network entity 202 includes a contextual subsystem 210, a P2P transport application 212, and a rules engine 214. The P2P transport application 212 interacts with the contextual subsystem 210 and the rules engine 214 to manage P2P information exchanges for the P2P network entity 202. The contextual subsystem 210 and the rules engine 214 will be described in greater detail below.

The contextual subsystem 210 is operable to provide dynamic context information to the P2P transport application 212 in connection with a proposed P2P information exchange. In various embodiments, functionality of the contextual subsystem 210 is exposed to the P2P transport application via, for example, an application programming interface (API). In various other embodiments, the contextual subsystem 210 may be considered an abstraction of a plurality of contextual sources that are accessible to the P2P transport application 212. The contextual subsystem 210 may be provided, for example, by a third-party software vendor, a given device vendor, or by an aggregation of multiple software and/or device vendors.

The contextual subsystem 210 typically leverages hardware and software resources of the P2P network entity 202 to produce the dynamic context information. For example, the contextual subsystem 210 can utilize global positioning system (GPS) capabilities, operating-system-provided resources, and the like. Therefore, it should be appreciated that the contextual subsystem 210 is typically operable to provide numerous categories of context information. For example, as described in greater detail below, the dynamic context information can include any combination of location information, proximity information, scheduling information, user information, security-capability information, service-type information, and content-classification information. Numerous other categories of context information are also contemplated and will be apparent to one of skill in the art after reviewing the inventive principles outlined herein.

The location information typically includes information indicative of a physical location of the P2P network entity 202. For example, in various embodiments, the location information identifies a geographic location (e.g., geographic coordinates). In various embodiments, the location information can further identify whether the P2P network entity is located indoors or outdoors. The proximity information includes information identifying a geographic proximity of the P2P network entity to a target such as, for example, another P2P network entity (e.g., a P2P network entity associated with a specific user), an object, or a geographic location. The scheduling information can include, for example, a current date and time.

The user information classifies a user of the network entity 202 and can include, for example, information identifying the user and a group and/or domain to which the user belongs. The security-capability information typically includes information identifying a security tier of the user. For example, the security-capability information can indicate whether the user has local, corporate, or cloud-level authentication. The service-type information usually classifies the proposed P2P information exchange, for example, as a file transfer, a screen share, a discovery broadcast, a discovery response, or the like. Finally, the content-classification information indicates a degree to which content such as, for example, a document or media file, is deemed confidential or sensitive. For example, the content-classification information can result from an analysis of the content and can include a score, a category classification, or the like.

The rules engine 214 establishes polices that determine, based on contextual variables, an allowability of managed classes of information-exchanges. Each managed class is a type of information exchange that the rules engine 214 is operable to evaluate based on contextual values. Each managed class can be uniquely identified, for example, by an identification number. The managed classes can include, for example, discovery broadcasts, discovery responses, connections to another P2P network entity, file transfers, print operations, screen shares (e.g., Wi-Fi-display functionality), or the like.

The policies of the rules engine 214 can be established by users, corporate administrators, or other parties. In a typical embodiment, each policy is a rule defined as a Boolean expression that evaluates to true or false. The Boolean expression for each rule typically specifies absolute values and/or ranges of values for each of one or more contextual variables. The values and/or ranges of values can be connected by Boolean operators such as, for example, AND, OR, and NOT. In various embodiments, the rules engine 214 may include a single rule for each managed class. In various other embodiments, the rules engine 214 supports a plurality of rules for each managed class.

Relative to a particular managed class, the rules engine 214 typically specifies a default action for information exchanges of the managed class. For example, the default action may be to deny information exchanges of the managed class. Each rule applicable to the managed class typically specifies at least one action, different from the default action, that is taken if the rule evaluates to true. The at least one action may be, for example, to allow a particular P2P information exchange. If no rule applicable to the managed class evaluates to true, the default action is generally taken.

Examples of rules will now be described. In various embodiments, a rule could be created to allow an information exchange of a managed class under specified conditions. For example, the rule could relate to discovery requests. The rule could specify an action of "allow" if a user of the P2P network entity 202 has at least local credentials and a location contextual value corresponds to either a corporate premises or the user's home. Similar rules can be created relative to other managed classes. Rules can also be used to define whitelists and/or blacklists regarding users or groups of users who can or cannot, respectively, perform specific types of information exchanges. By way of further example, relative to the content-classification information, rules can be created to establish access-control lists specifying who can access certain categories of content. Furthermore, as described in greater detail with respect to FIG. 4, rules can also be created to define an approved P2P connection list.

In operation, when the P2P transport application 212 identifies a potential P2P information exchange, the P2P transport application 212 acquires appropriate dynamic context information from the contextual subsystem 210. The acquired dynamic context information supplies contextual values that can be used for performing a rules-engine check with the rules engine 214. The rules-engine check determines an allowability of the potential P2P information exchange given the acquired dynamic context information. Examples will be described with respect to FIGS. 3-5.

Figure 3:
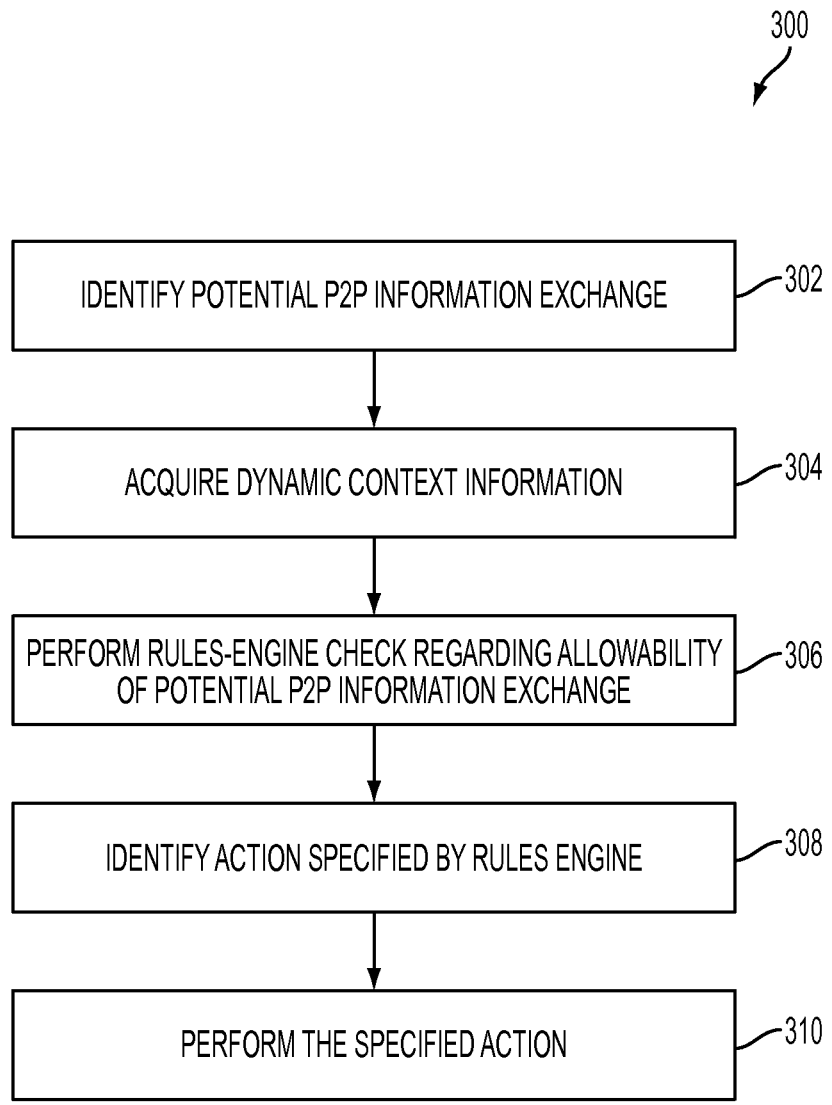
FIG. 3 illustrates a process for managing P2P information exchanges.

FIG. 3 illustrates a process 300 for managing P2P information exchanges. The process 300 can be executed, for example, by a P2P transport application executing on a P2P network entity. In a typical embodiment, the P2P transport application and the P2P network entity operate as described with respect to the P2P transport application 212 and the P2P network entity 202, respectively, of FIG. 2. The process 300 begins at step 302.

At step 302, the P2P transport application identifies a potential P2P information exchange. The potential P2P information exchange can be, for example, a discovery broadcast, a discovery response, a connection to another P2P network entity, a file transfer, a print operation, a screen share (e.g., Wi-Fi-display functionality), or the like. In various embodiments, the potential P2P information exchange can be identified, for example, by a user of the P2P network entity requesting that the potential P2P information exchange be performed. In various embodiments, the potential P2P information exchange can be triggered by receipt of an information exchange from another P2P network entity (e.g., a received discovery request). From step 302, the process 300 proceeds to step 304.

At step 304, the P2P transport application acquires dynamic context information from a contextual subsystem such as, for example, the contextual subsystem 210 of FIG. 2. The dynamic context information typically supplies contextual values that map to contextual variables of rules included within a rules engine such as, for example, the rules engine 214 of FIG. 2. From step 304, the process 300 proceeds to step 306.

At step 306, the P2P transport application performs a rules-engine check regarding an allowability of the proposed P2P information exchange given the dynamic context information. From step 306, the process 300 proceeds to step 308. At 308, the P2P transport application identifies at least one action specified by the rules engine responsive to the rules-engine check. For example, the at least one action may be to allow the proposed P2P information exchange responsive to a rule evaluating to true. By way of further example, the at least one action may include conditional logic. For example, the at least one action may include warning the user and/or asking for permission before performing the proposed P2P information exchange. Responsive to no rule evaluating to true, the at least one action may be a default action such as, for example, denial of the proposed P2P information exchange. From step 308, the process 300 proceeds to step 310. At step 310, the P2P transport application performs the specified at least one action. After step 310, the process 300 ends.

It should be appreciated that numerous types of P2P information exchanges can be managed in the fashion described above. By way of example, FIGS. 4-5 describe how to manage information exchanges that occur as part of performing P2P discovery and establishing P2P connections. For purposes of this description, a P2P network entity that initiates a discovery process will be referenced herein as an initiating P2P network entity. Similarly, a P2P network entity that responds to an initiating P2P network entity will be referenced herein as a responding P2P network entity.

Figure 4:
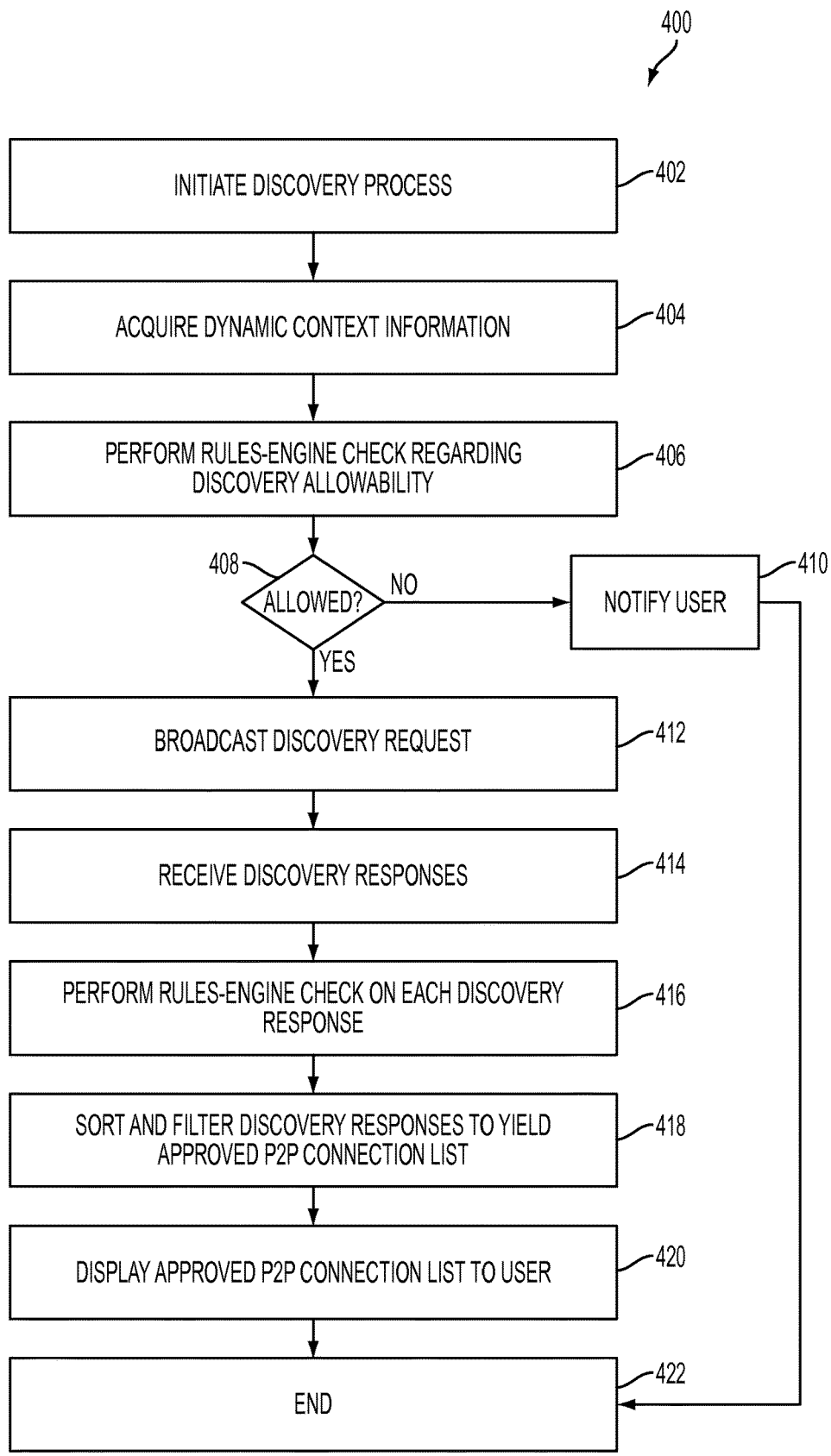
FIG. 4 illustrates a process for performing P2P discovery from the perspective of an initiating P2P network entity.

FIG. 4 illustrates a process 400 for performing P2P discovery from the perspective of an initiating P2P network entity. The process 400 can be executed, for example, by a P2P transport application executing on the initiating P2P network entity. In a typical embodiment, the P2P transport application and the initiating P2P network entity operate as described with respect to the P2P transport application 212 and the P2P network entity 202, respectively, of FIG. 2. The process 400 begins at step 402.

At step 402, the P2P transport application initiates a P2P discovery process. In a typical embodiment, the P2P discovery process may be initiated as a result of a user of the initiating P2P network entity requesting, via a user interface, that the P2P discovery process occur. At this point, broadcasting a discovery request is considered a proposed P2P information exchange. From step 402, the process 400 proceeds to step 404. At step 404, the P2P transport application acquires dynamic context information from a contextual subsystem such as, for example, the contextual subsystem 210 of FIG. 2. The dynamic context information typically supplies contextual values that map to contextual variables of rules included within a rules engine such as, for example, the rules engine 214 of FIG. 2. From step 404, the process 400 proceeds to step 406.

At step 406, the P2P transport application performs a rules-engine check regarding an allowability of broadcasting a discovery request given the dynamic context information. From step 406, the process 400 proceeds to step 408. At step 408, it is determined whether, based on the rules-engine check, broadcasting a discovery request is allowed. In a typical embodiment, the rules engine specifies an action of "allow" if a rule in the rules engine evaluates to true. In a typical embodiment, the rules engine otherwise specifies a default action of "deny." If it is determined at step 408 that broadcasting a discovery request is not allowed, the process 400 proceeds to step 410. At step 410, the P2P transport application notifies the user that broadcasting a discovery request is not currently permitted, thereby performing the action of "deny" specified by the rules engine. From step 410, the process 400 proceeds to step 412 and ends.

If it is determined at step 408 that broadcasting a discovery request is allowed, the process 400 proceeds to step 412. At step 412, the P2P transport application broadcasts a discovery request, thereby performing the action of "allow" specified by the rules engine. From step 412, the process 400 proceeds to step 414. At step 414, the P2P network entity receives one or more discovery responses from one or more responding P2P network entities. At this point, connections with the one or more responding P2P network entities are each considered proposed P2P information exchanges. From step 414, the process 400 proceeds to step 416. At step 416, the P2P transport application performs a rules-engine check regarding an allowability of connecting with each of the responding P2P network entities. In a typical embodiment, the rules-engine check is performed relative to the dynamic context information acquired at step 404 as well as additional dynamic context information relating to the responding P2P network entities. From step 416, the process 400 proceeds to step 418.

At step 418, the P2P transport application sorts and filters the discovery responses based on the rules-engine check to yield an approved P2P connection list. For example, in a typical embodiment, the rules engine specifies either an action of "exclude" or "include" for each of the responding P2P network entities. Those responding P2P network entities for which the action of "include" is specified are included in the approved P2P connection list. Those responding P2P network entities for which the action of "exclude" is specified are excluded from the approved P2P connection list.

In addition, the rules engine typically assigns a priority to each responding network entity for which the action of "include" is specified. Therefore, the approved P2P connection list is typically sorted so that P2P network entities having a higher priority appear higher on the approved P2P connection list. From step 418, the process 400 proceeds to step 420. At step 420, the P2P transport application displays the approved P2P connection list to the user. In a typical embodiment, the P2P transport application allows the user to connect to P2P network entities on the P2P connection list. From step 420, the process 400 proceeds to step 422. At step 422, the process 400 ends.

Figure 5:
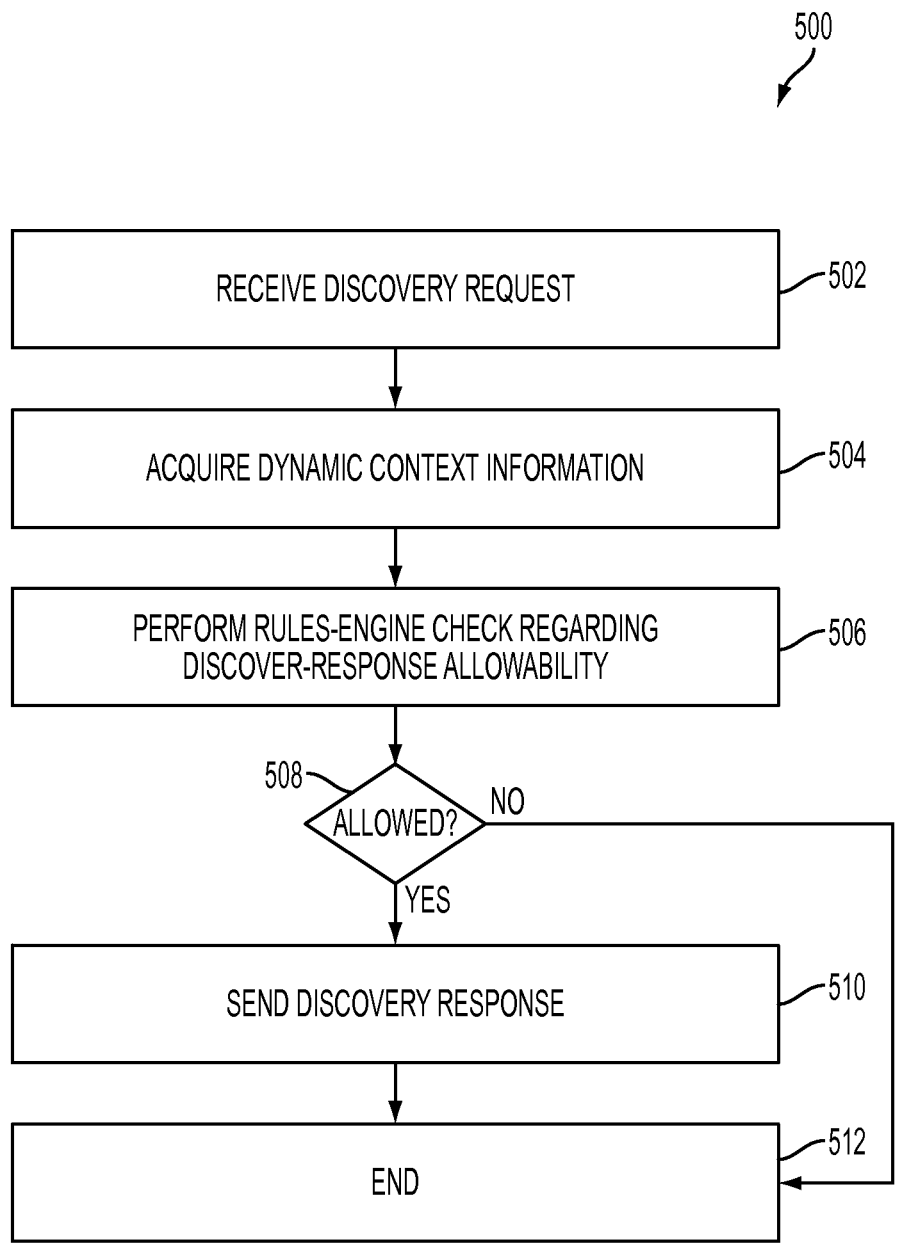
FIG. 5 illustrates a process for performing P2P discovery from the perspective of a responding P2P network entity.

FIG. 5 illustrates a process 500 for performing P2P discovery from the perspective of a responding P2P network entity. The process 500 can be executed, for example, by a P2P transport application executing on the responding P2P network entity. In a typical embodiment, the P2P transport application and the responding P2P network entity operate as described with respect to the P2P transport application 212 and the P2P network entity 202, respectively, of FIG. 2. The process 500 begins at step 502.

At step 502, the responding P2P network entity receives a discovery request that has been broadcast, for example, as described with respect to FIG. 4. From step 502, the process 500 proceeds to step 504. At step 504, the P2P transport application acquires dynamic context information from a contextual subsystem such as, for example, the contextual subsystem 210 of FIG. 2. The dynamic context information typically supplies contextual values that map to contextual variables of rules included within a rules engine such as, for example, the rules engine 214 of FIG. 2. From step 504, the process 500 proceeds to step 506.

At step 506, the P2P transport application performs a rules-engine check regarding an allowability of responding to the discovery request given the dynamic context information. From step 506, the process 500 proceeds to step 508. At step 508, it is determined whether, based on the rules-engine check, responding to the discovery request is allowed. In a typical embodiment, the rules engine specifies an action of "allow" if a rule in the rules engine evaluates to true. In a typical embodiment, the rules engine otherwise specifies a default action of "deny." If it is determined at step 508 that responding to the discovery request is not allowed, the process 500 proceeds to step 512 and ends, thereby performing the action of "deny" specified by the rules engine. If it is determined at step 508 that responding to the discovery request is allowed, the process 500 proceeds to step 510. At step 510, the P2P transport application sends a response to the discovery request, thereby performing the action of "allow" specified by the rules engine. From step 510, the process 500 proceeds to step 512. At step 512, the process 500 ends.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method of variably controlling information exchanges over Wi-Fi-based peer-to-peer (P2P) networks, the method comprising:
   on a P2P network wireless device comprising a processor and memory, receiving, via a user interface on the P2P network wireless device, a user request for a P2P information exchange over a Wi-Fi-based P2P network;
   responsive to the receiving, acquiring dynamic context information comprising first and second contextual values that map to first and second contextual variables of stored rules, wherein the first contextual value and the first contextual variable each relate to an information-exchange type, wherein the second contextual value and the second contextual variable each relate to at least one of a current time, a physical location of the P2P network wireless device and a proximity of the P2P network wireless device to another device, and wherein the stored rules establish an allowability of a plurality of managed classes of P2P information exchanges;

performing, by the P2P network wireless device, a rules check of the stored rules to determine an allowability of the user-requested P2P information exchange based on the mapping of the first and second contextual values of the acquired dynamic context information to the first and second contextual variables of the stored rules;

identifying whether the user-requested P2P information exchange is allowed or denied based on a result of the rules check;

responsive to an identification based on the rules check that the user-requested P2P information exchange over the Wi-Fi-based P2P network is allowed, performing, by the P2P network wireless device, the user-requested P2P information exchange over the Wi-Fi-based P2P network via a hosted virtual access point provided by at least one of the P2P network wireless device and another P2P network wireless device; and responsive to an identification based on the rules check that the user-requested P2P information exchange over the Wi-Fi-based P2P network is denied, denying, by the P2P network wireless device, the user-requested P2P information exchange.

2. The method of claim 1, comprising, pursuant to at least one of the stored rules, requesting user permission prior to the performing the user-requested P2P information exchange.

3. The method of claim 1, wherein the user-requested P2P information exchange comprises broadcasting a discovery request.

4. The method of claim 1, wherein the user-requested P2P information exchange comprises connecting to a responding P2P network wireless device relative to a broadcast discovery request.

5. The method of claim 4, comprising performing an action selected from the group consisting of including and excluding the responding P2P network wireless device from an approved P2P connection list.

6. The method of claim 4, wherein performing the rules check comprises identifying a priority of the responding P2P network wireless device.

7. The method of claim 5, comprising:
wherein the approved P2P connection list comprises a priority for each of a plurality of responding P2P network wireless devices; and
sorting the approved P2P connection list based on the priority.

8. The method of claim 1, wherein performing the rules check comprises determining whether at least one rule of the stored rules evaluates to true.

9. The method of claim 8, wherein the at least one rule comprises a Boolean expression specifying a plurality of contextual variables.

10. The method of claim 9, wherein at least a portion of the plurality of contextual variables relate to at least one selected from the group consisting of: location information, proximity information, scheduling information, user information, security-capability information, service-type information, and content-classification information.

11. The method of claim 1, wherein the user-requested P2P information exchange comprises connection to the other P2P network wireless device.

12. The method of claim 1, wherein the user-requested P2P information exchange comprises a response to a discovery request.

13. The method of claim 1, wherein the user-requested P2P information exchange comprises at least one selected from the group consisting of: a file transfer, a print operation, and a screen share.

14. An information handling system comprising:
a network interface operable to perform peer-to-peer (P2P) information exchanges;
a memory;
a processing unit communicably coupled to the network interface and the memory, wherein the processing unit is operable to:
receive, via a user interface on the information handling system, a user request for a P2P information exchange over a Wi-Fi-based P2P network;
acquire dynamic context information comprising first and second contextual values that map to first and second contextual variables of stored rules, wherein the first contextual value and the first contextual variable each relate to an information-exchange type, wherein the second contextual value and the second contextual variable each relate to at least one of a current time, a physical location of the information handling system and a proximity of the information handling system to another device, and wherein the stored rules establish an allowability of a plurality of managed classes of P2P information exchanges;
perform a rules check of the stored rules to determine an allowability of the user-requested P2P information exchange based on the mapping of the first and second contextual values of the acquired dynamic context information to the first and second contextual variables of the stored rules;
identify whether the user-requested P2P information exchange is allowed or denied based on a result of the rules check;
responsive to an identification based on the rules check that the user-requested P2P information exchange over the Wi-Fi-based P2P network is allowed, performing the user-requested P2P information exchange over the Wi-Fi-based P2P network via a hosted virtual access point provided by at least one of the information handling system and another information handling system; and
responsive to an identification based on the rules check that the user-requested P2P information exchange over the Wi-Fi-based P2P network is denied, deny the user-requested P2P information exchange.

15. The information handling system of claim 14, comprising:
wherein the user-requested P2P information exchange comprises connection to a responding P2P network wireless device relative to a broadcast discovery request; and
comprises performance of an action selected from the group consisting of inclusion and exclusion of the responding P2P network wireless device from an approved P2P connection list.

16. The information handling system of claim 14, comprising:
- wherein at least one rule of the stored rules comprises a Boolean expression specifying a plurality of contextual variables; and
- wherein at least a portion of the plurality of contextual variables relate to at least one selected from the group consisting of: location information, proximity information, scheduling information, user information, security-capability information, service-type information, and content-classification information.

17. A computer-program product comprising a non-transitory computer-usable medium having computer-readable program code embodied therein, the computer-readable program code adapted to be executed to implement a method of variably controlling information exchanges over Wi-Fi-based peer-to-peer (P2P) networks, the method comprising:
- on a P2P network wireless device comprising a processor and memory, receiving, via a user interface on the P2P network wireless device, a user request for a P2P information exchange over a Wi-Fi-based P2P network;
- responsive to the receiving, acquiring dynamic context information comprising first and second contextual values that map to first and second contextual variables of stored rules, wherein the first contextual value and the first contextual variable each relate to an information-exchange type, wherein the second contextual value and the second contextual variable each relate to at least one of a current time, a physical location of the P2P network wireless device and a proximity of the P2P network wireless device to another device, and wherein the stored rules establish an allowability of a plurality of managed classes of P2P information exchanges;
- performing, by the P2P network wireless device, a rules check of the stored rules to determine an allowability of the user-requested P2P information exchange based on the mapping of the first and second contextual values of the acquired dynamic context information to the first and second contextual variables of the stored rules;
- identifying whether the user-requested P2P information exchange is allowed or denied based on a result of the rules check;
- responsive to an identification based on the rules check that the user-requested P2P information exchange over the Wi-Fi-based P2P network is allowed, performing, by the P2P network wireless device, the user-requested P2P information exchange over the Wi-Fi-based P2P network via a hosted virtual access point provided by at least one of the P2P network wireless device and another P2P network wireless device; and
- responsive to an identification based on the rules check that the user-requested P2P information exchange over the Wi-Fi-based P2P network is denied, denying, by the P2P network wireless device, the user-requested P2P information exchange.

* * * * *